(12) United States Patent
Malkin

(10) Patent No.: US 9,697,480 B2
(45) Date of Patent: Jul. 4, 2017

(54) PROCESS ANALYSIS, SIMULATION, AND OPTIMIZATION BASED ON ACTIVITY-BASED COST INFORMATION

(75) Inventor: Wayne Malkin, Alberta (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1948 days.

(21) Appl. No.: 11/958,182

(22) Filed: Dec. 17, 2007

(65) Prior Publication Data
US 2009/0157448 A1    Jun. 18, 2009

(51) Int. Cl.
G06Q 10/00    (2012.01)
G06Q 10/06    (2012.01)
G06Q 10/04    (2012.01)

(52) U.S. Cl.
CPC ............ *G06Q 10/06* (2013.01); *G06Q 10/04* (2013.01); *G06Q 10/0633* (2013.01)

(58) Field of Classification Search
CPC ..... G06Q 10/06; G06Q 10/04; G06Q 10/0633
See application file for complete search history.

(56) References Cited

U.S. PATENT DOCUMENTS

| | | | |
|---|---|---|---|
| 5,790,847 A | 8/1998 | Fisk et al. | |
| 5,890,133 A * | 3/1999 | Ernst | 705/7 |
| 5,946,661 A * | 8/1999 | Rothschild et al. | 705/7 |
| 6,978,222 B2 * | 12/2005 | Roser et al. | 702/182 |
| 2003/0187708 A1 * | 10/2003 | Baydar et al. | 705/7 |
| 2003/0217053 A1 | 11/2003 | Bachman et al. | |
| 2003/0220828 A1 * | 11/2003 | Hwang et al. | 705/8 |
| 2003/0233273 A1 * | 12/2003 | Jin et al. | 705/11 |
| 2003/0236721 A1 | 12/2003 | Plumer et al. | |
| 2004/0034555 A1 * | 2/2004 | Dismukes et al. | 705/7 |
| 2004/0153397 A1 | 8/2004 | Cavey | |
| 2005/0027585 A1 | 2/2005 | Wodtke et al. | |
| 2005/0209841 A1 * | 9/2005 | Arning et al. | 703/22 |
| 2005/0209942 A1 | 9/2005 | Ballow et al. | |
| 2006/0184413 A1 * | 8/2006 | DelMonego et al. | 705/9 |

OTHER PUBLICATIONS

U.S. Appl. No. 11/957,631, filed Jan. 17, 2007, Malkin.
Zur Muehlen, Michael, Workflow-based Process Controlling—Or: What You Can Measure You Can Control, Workflow Handbook 2001, 2000, pp. 61-77, Future Strategies Inc., Lighthouse Point, FL.
Watanabe, Sadaki et al. Workflow Analysis Method Using Activity-Based Costing Management with Information Allocation, Electronics and Communications in Japan, Part III: Fundamental Electronic Science, 2004, vol. 87, Issue 8 pp. 55-65, John Wiley & Sons, Inc.

* cited by examiner

*Primary Examiner* — Kevin Flynn
*Assistant Examiner* — Brian Tallman
(74) *Attorney, Agent, or Firm* — Patterson + Sheridan, LLP

(57) ABSTRACT

A computer-implemented method of analyzing a workflow is provided. The method can include generating a multi-stage workflow representation corresponding to a physical process, the representation defining for each stage of the workflow at least one activity performed during the process. The method also can include associating at least one activity-based cost with each activity performed during the process, and estimating a distribution of costs over the stages of the workflow based on cost data generated by repeated execution of the process. The method can further include determining, based upon the estimated distribution of costs, whether a cost imbalance is associated with at least one stage of the workflow.

20 Claims, 4 Drawing Sheets

PROCESS ANALYSIS, SIMULATION, AND OPTIMIZATION BASED ON ACTIVITY-BASED COST INFORMATION

FIELD OF THE INVENTION

The present invention is related to the field of process analysis, and more particularly, to the analysis, simulation, and optimization of workflows using activity-based cost information.

BACKGROUND OF THE INVENTION

Broadly defined, a workflow is the automation of a process, such as a business process, in which documents and information are processed, issues determined, tasks defined and executed, and various other activities occur in a repeatable pattern supported by the systematic organization of resources. Once a process has been automated as a workflow, statistical data pertaining to various aspects of the workflow can be readily collected, assembled, and analyzed. A systematic analysis of the data can suggest ways to improve the workflow. This analysis can be facilitated using tools often referred to as Process Analytics. Other tools are available for testing and evaluating suggested changes, these tools often being referred to as Process Simulations.

Currently-available workflow tools can report on the number of times that the steps in a workflow are performed, as well paths taken in executing the workflow. To date, however, the available tools have not adequately provided a mechanism by which a financial model and the workflow can be integrated so as to efficiently and effectively enhance the value of process analysis, simulation, and improvement efforts.

SUMMARY OF THE INVENTION

The invention is directed to systems and methods for analyzing, simulating and optimizing a defined workflow. One object of the invention is to enhance such analysis, simulation, and optimization by integrating the workflow with a financial model that incorporates activity-based costs associated with different stages of the workflow.

A first embodiment of the invention is a computer-based system for analyzing a workflow. The system can include a workflow-generating module for generating a multi-stage workflow corresponding to a physical process, the workflow defining for each stage of the process at least one activity to be performed at that stage. Additionally, the system can include a cost-activity-associating module for associating activity-based costs with each activity performed. The cost-activity-associating module may also introduce cost activities without corresponding workflow activities, as a method of tracking additional costs not reflected in the workflow. The system further can include a cost-distribution-estimating module for estimating a distribution of costs over the stages of the workflow based on cost data generated by repeated executions of the process.

Another embodiment of the invention is a method for analyzing a workflow. The method can include generating a multi-stage workflow corresponding to a physical process. For each stage of the workflow, one or more activities can be specified as being performed at that stage. The method also can include associating at least one activity-based cost with each activity performed, and estimating a distribution of costs over the stages of the workflow based on cost data generated by repeated execution of the process.

Still another embodiment of the invention is a computer-readable storage medium in which is embedded computer-readable code. The computer-readable storage medium can be configured to cause the computer, when the computer-readable code is loaded in and executed by the computer, to generate a multi-stage workflow corresponding to a physical process, associate at least one activity-based cost with each activity performed during the workflow, and estimate a distribution of costs over the stages of the workflow based on cost data generated by repeated execution of the process.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention is directed to systems and methods for analyzing a workflow. Additionally, the system and methods provide for simulating changes in the workflow and determining, based upon the simulated changes, the financial effects of changes to the underlying process. The insights provided by process analysis and simulation of a process modeled as a workflow can be significantly enhanced by integrating cost-based information with the workflow model.

Figure 1:
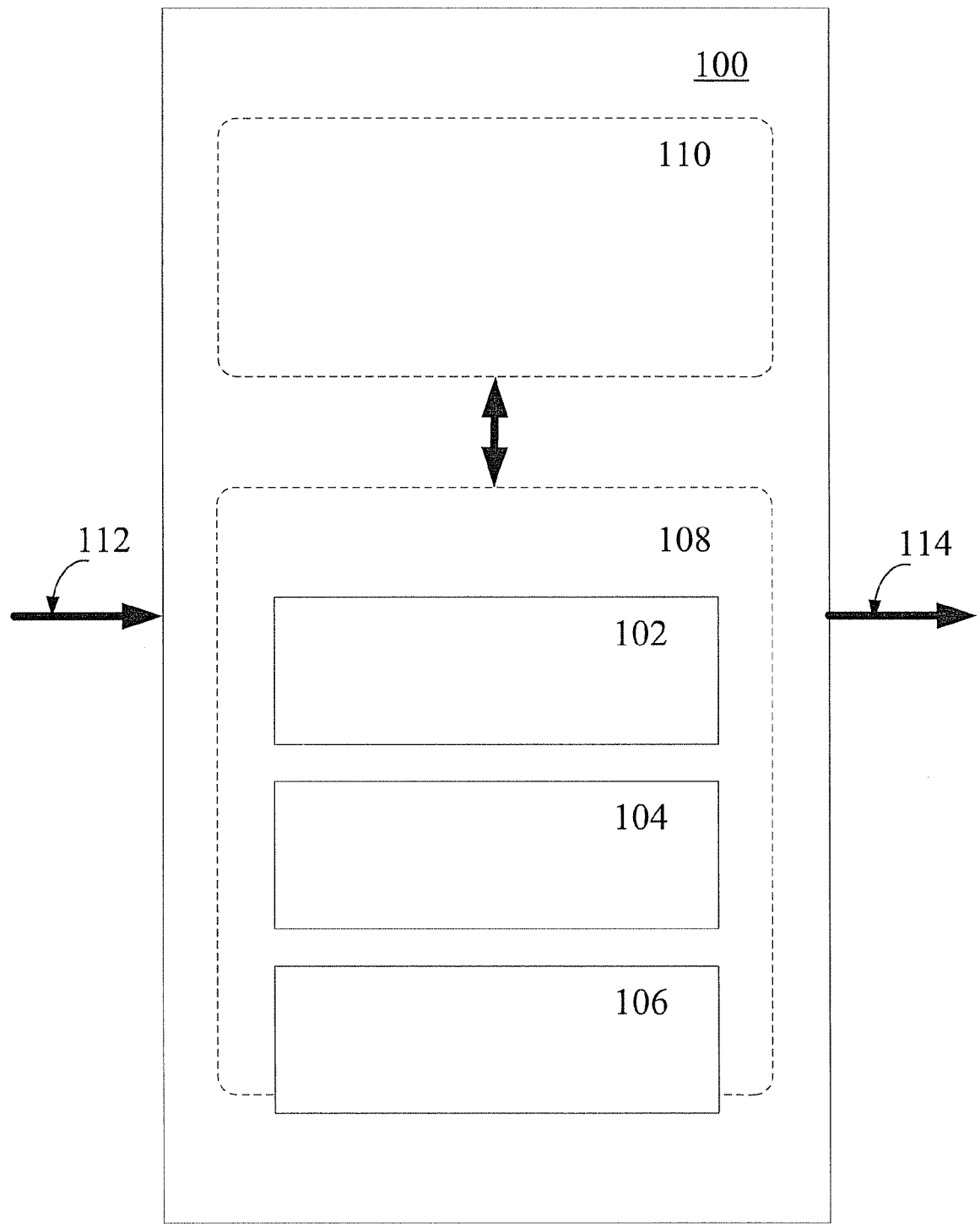
FIG. 1 is a schematic view of a system for analyzing a workflow, according to one embodiment of the invention.

FIG. 1 is a schematic view of a system 100 for analyzing a workflow according to one embodiment of the invention. Illustratively, the system 100 includes a workflow-generating module 102. The system 100 also illustratively includes a cost-activity-associating module 104 in communication with the workflow-generating module 102. Additionally, the system 100 illustratively includes a cost-distribution-estimating module 106, also in communication with the workflow-generating module 102, as well as with the cost-activity-associating module 104.

One or more of the workflow-generating module 102, the cost-activity-associating module 104, and the cost-distribution-estimating module 106 can be implemented in hardwired circuitry configured to process data and execute the procedures described herein. Alternatively, however, one or more of the modules 102, 104, 106 can be implemented in computer-executable code configured to execute upon a general-purpose or application specific computing device so as to cause the device to perform the same procedures. Accordingly, the system 100 optionally includes a processor 108 for executing computer-readable code and a memory 110 for storing the computer-readable code along with data processed according to the procedures implemented by the modules 102, 104, 106. The data can be supplied through a standard input/output (I/O) device 112, and the results of the procedures performed on the data can be output on a different I/O device 114 or the same I/O device. In still another embodiment, one or more of the modules 102, 104, 106 can be implemented in a combination of hardwired circuitry and computer-readable code.

Operatively, the workflow-generating module 102 generates a multi-stage workflow representation corresponding to a physical process, whether a business process or some other process involving multiple activities at various stages. The workflow generated by the workflow-generating module 102, accordingly, defines for each stage of the workflow at least one activity performed during the process.

Figure 2:
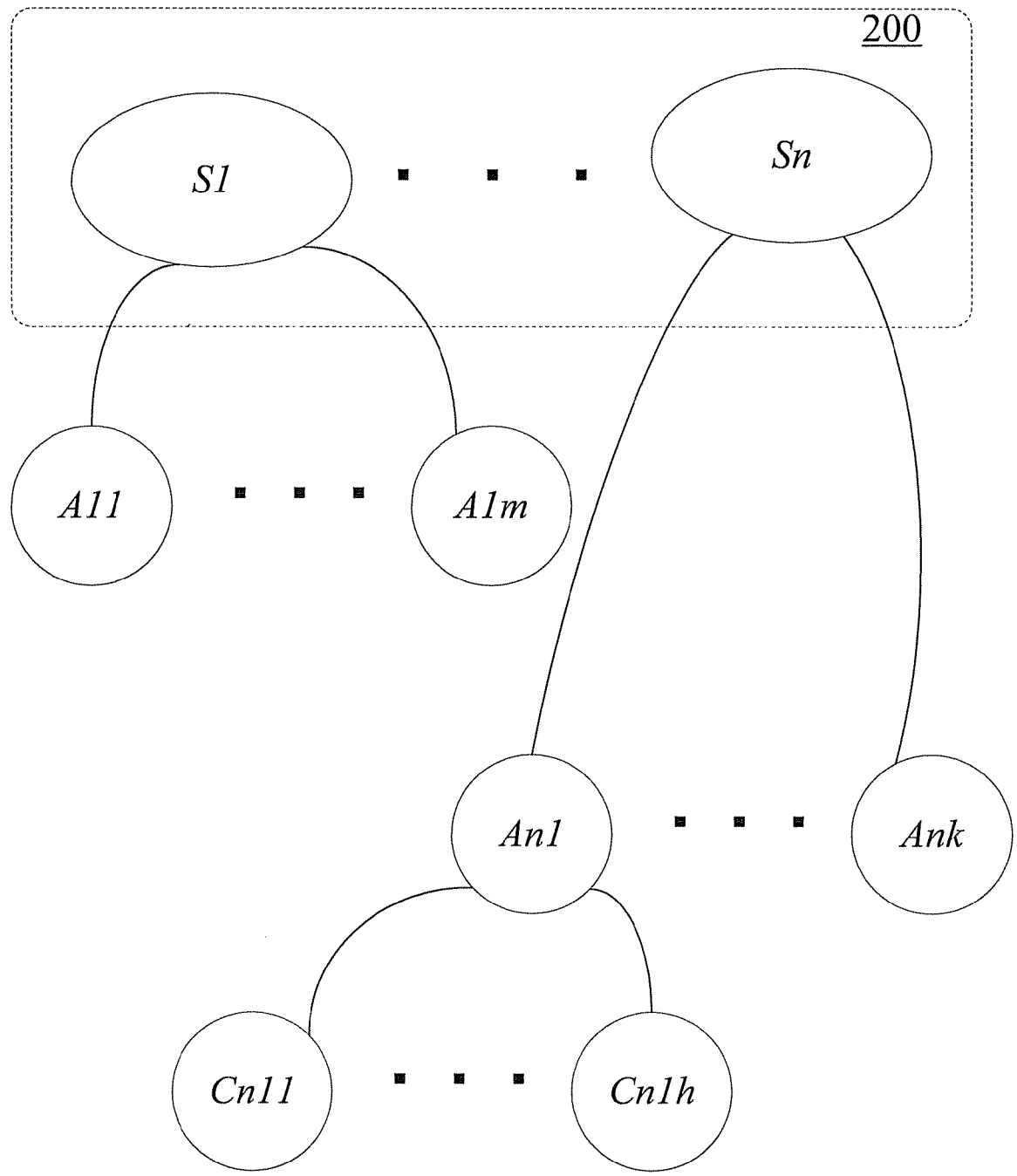
FIG. 2 is a schematic view of activities performed at stages of the workflow and costs associated therewith, according to another embodiment of the invention.

For example, if implemented in computer-readable code in an object-oriented programming environment, the workflow-generating module 102 can generate a representation of the workflow that includes a class of objects corresponding to each stage. Each activity can likewise be objects of a subclass and be associated with a particular object corresponding to a particular stage of the multi-stage workflow. Referring additionally now to FIG. 2, the stages of an n-stage workflow 200 are represented by objects S1 through Sn. One or more activities is performed at each stage. At stage 1, for example, m activities are performed, these being schematically shown as objects A11 through A1$m$. At the n-th stage of this exemplary workflow 200, k activities are performed. The n-th stage activities are schematically shown as objects An1 through Ank. As described more particularly in the following, one or more costs is associated with each activity performed at a particular stage of the workflow 200. These are illustrated for activity An1 as Cnk1 through Cnkh.

The costs associated with an activity can include, for example, fixed costs, variable costs of activity-associated tasks, variable costs based upon time-of-execution of an activity (generally, for any process, the more rapidly an activity must be performed, the higher the cost of the activity). Other costs include the opportunity cost of the wait time between two consecutive stages of the workflow; that is, the cost of opportunities lost because resources that could be otherwise employed more productively elsewhere, but instead not utilized, or are underutilized, waiting for another task to be completed. Still other costs include storage costs associated with an activity, utilization costs of a resource used in conjunction with an activity, and an implicit cost of allocated overhead, such as those allocated through capital budgeting techniques.

Regardless of the nature of the costs, the cost-activity-associating module 104 matches all relevant activity-based costs corresponding to each of the activities performed during the process. Once the activity-based costs are integrated with the other elements of the workflow 200, and the workflow has been in production for a sufficient period of time, the details of activity or task execution can be analyzed to determine a distribution of costs across the various stages of the workflow 200. Accordingly, the cost-distribution-estimating module 106 is configured to estimate a distribution of costs over each of the stages of the workflow based on cost data generated by repeated execution of the process.

The cost-distribution-estimating module 106 can, according to one embodiment, be further configured to determine, based upon the estimated distribution of costs, whether a cost imbalance is associated with at least one stage of the workflow. For example, the analysis performed by the system 100 of a particular manufacturing process might reveal that the stage at which an inspection of certain goods is performed represents a disproportionate share of the total cost of each good manufactured through the process.

The workflow-generating module 102 can be further configured to associate at least one parameter with each activity. The parameter can be a parameter that quantifies the manner in which a particular task is performed, for example, or even whether the task is performed at all (e.g., a binary variable). The system 100 optionally can further include a simulating module. The simulating module can simulate a change in the distribution of costs by varying the at least one parameter during a simulation of the process under varying conditions, the variable conditions being reflected by changes in one or more corresponding parameters. Thus, once a change or set of changes to the process are proposed, the system can execute a simulation, collecting cost information from the appropriately modified workflow representation. The proposed change, accordingly, can be evaluated in terms of the cost effects that would result from the change.

The effects of changes to the manner in which the process is performed are not the only effects that can be considered using the system 100. In still another embodiment, one or more parameters that can be included are those associated with human and non-human resources required during the process, in particular the cost of those resources. For example, the price of oil can have a significant effect with respect to providing electrical output and providing airline services. Accordingly, at least one parameter can be a price-per-unit of a resource used during at least one stage of the workflow. The cost-activity-associating module 104 can be configured to iteratively vary the price-per-unit of a resource. The cost-distribution-estimating module 106 can correspondingly determine the likely changes in the distribution of costs resulting from changes in the price-per-unit.

Moreover, evaluating a process in terms of the total cost of the workflow as well as the contribution made to total cost by each activity at each stage, facilitates optimizing techniques that show what changes at which stage can be made so as to optimize some aspect of the process. Thus, according to still another embodiment, the system 100 optionally can include an optimization module for determining process changes at one or more stages of the workflow that would result in a minimization of costs or a maximization of revenues or profits derived from the process. The minimum total cost of the workflow can be estimated using the estimated distribution of costs and iteratively varying the at least one parameter to reflect simulated changes in the process.

Likewise, the optimization module of the system can estimate a total revenue generated by a simulated completion of the process. The maximum obtainable profit can be estimated by simulating a change in the process by varying at least one parameter of the workflow. More particularly, the optimization module can iteratively vary the estimated total revenue and/or the estimated distribution of costs by varying the relevant parameters so as to identify the conditions resulting in a maximum profit. Various known mathematical techniques can be implemented by the optimization, such as Lagrange Optimization.

Other effects that can be analyzed by the system 100, include resource constraints. For example, the resource capacity of skilled worker groups or specialized machinery can impose significant constraints on a process. Some resources are not readily scalable, and thus small or even large variations in resource requirements may not yield corresponding financial benefits. To assess these effects, the system 100 according to still another embodiment can include a simulating module for varying at least one resource constraint, or parameter representing the constraint. It can then be determined the effect of the constraint as reflected by any corresponding change in the distribution of costs that results. Conversely, the simulating module can be configured to simulate the effects of excess capacity so that resources can be reallocated so as to improve the distribution of costs over the various stages of the workflow.

Figure 3:
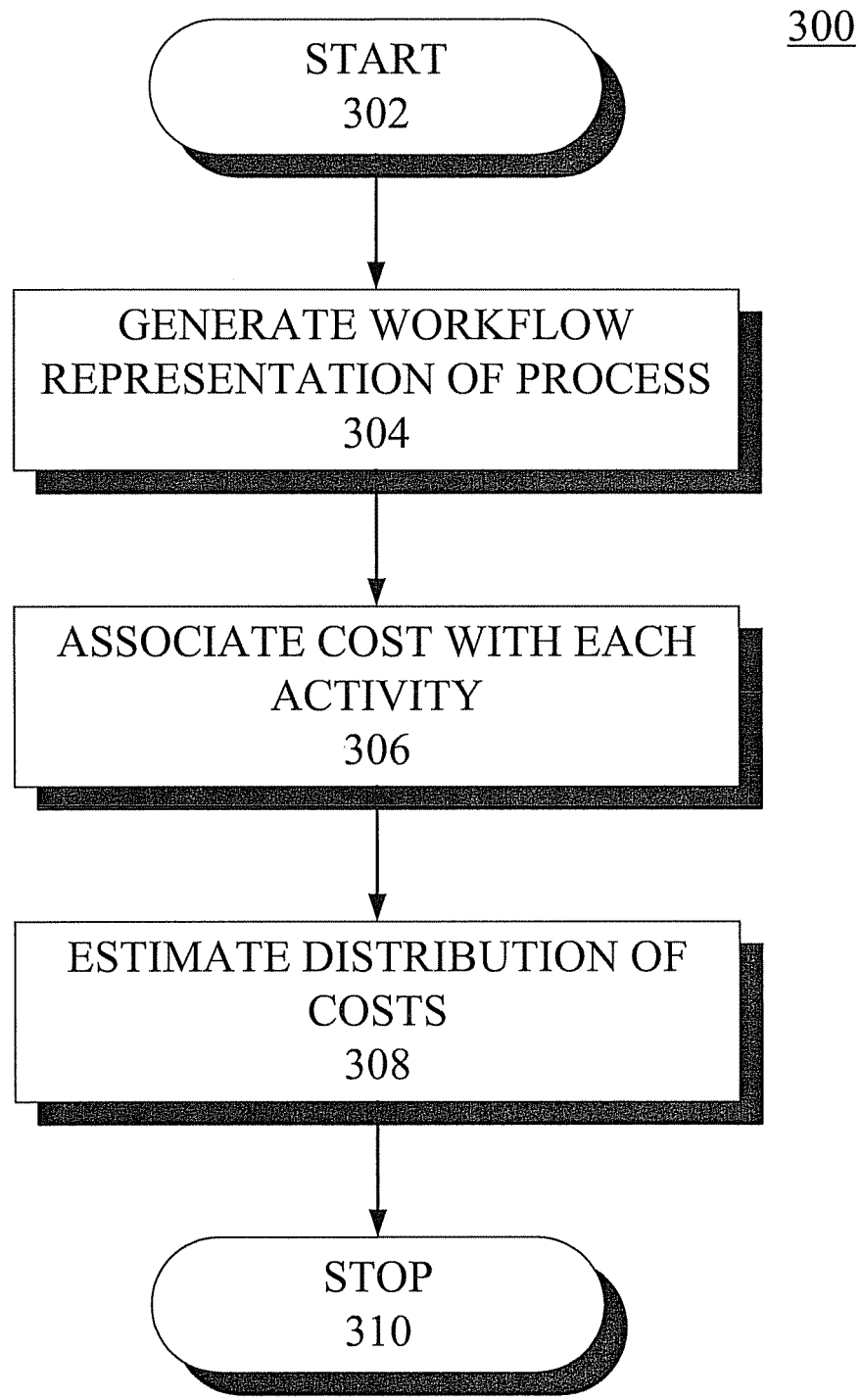
FIG. 3 is a flowchart of exemplary steps in a method for analyzing a workflow, according to yet another embodiment of the invention.

Referring now to FIG. 3, a method aspect of the invention is illustrated by the flowchart of exemplary steps in a method 300 of analyzing a process. As illustrated, after the start at step 302, the method 300 illustratively includes generating a multi-stage workflow corresponding to a physical process at step 304, the workflow can define at each stage at least one activity performed during the process. The method 300 further illustratively includes, at step 306, associating at least one activity-based cost with each activity performed during the process.

Some activities in the workflow, however, will not have associated costs, or the cost will be so small as to not be beneficially included in the financial model (e.g., doing so may clutter the output without a compensating benefit). Also, some cost-generating activities may not be modeled in the workflow. Thus, in one embodiment of the invention, the method further comprises including such items in the workflow as cost-only steps; that is, steps in the workflow that accumulate costs but do no work.

At step 308, the method 300 illustratively includes estimating a distribution of costs over the stages of the workflow based on cost data generated by repeated execution of the process. The method 300 illustratively concludes at step 310.

Optionally, the method 300 can further include determining, based upon the estimated distribution of costs, whether a cost imbalance is associated with at least one stage of the workflow. As already described in the context of a system for analyzing a process, at least one parameter can be associated with each activity of the workflow. Accordingly, the method also can include simulating a change in the distribution of costs by varying at least one parameter during a simulation of the process under varying conditions. Likewise, the method can additionally include minimizing a total cost of the workflow using the estimated distribution of costs and iteratively varying at least one parameter to reflect simulated changes in the process.

The method similarly can include estimating a total revenue generated by a simulated completion of the process, and maximizing an estimated profit by simulating changes in the process by varying at least one parameter of the workflow, wherein the simulated change iteratively varies at least one among an estimated total revenue and the estimated distribution of costs. The method, moreover, can specify one or more parameters as the price-per-unit of a resource used during at least one stage of the workflow, and can further comprise iteratively varying the price-per-unit and, in response thereto, determining corresponding changes in the distribution of costs based upon changes in the price-per-unit. The method can further include associating at least one resource constraint with at least one stage of the workflow and simulating a change in the process by varying the at least one resource constraint and determining for each simulated change in the process a corresponding change in the distribution of costs.

Figure 4:
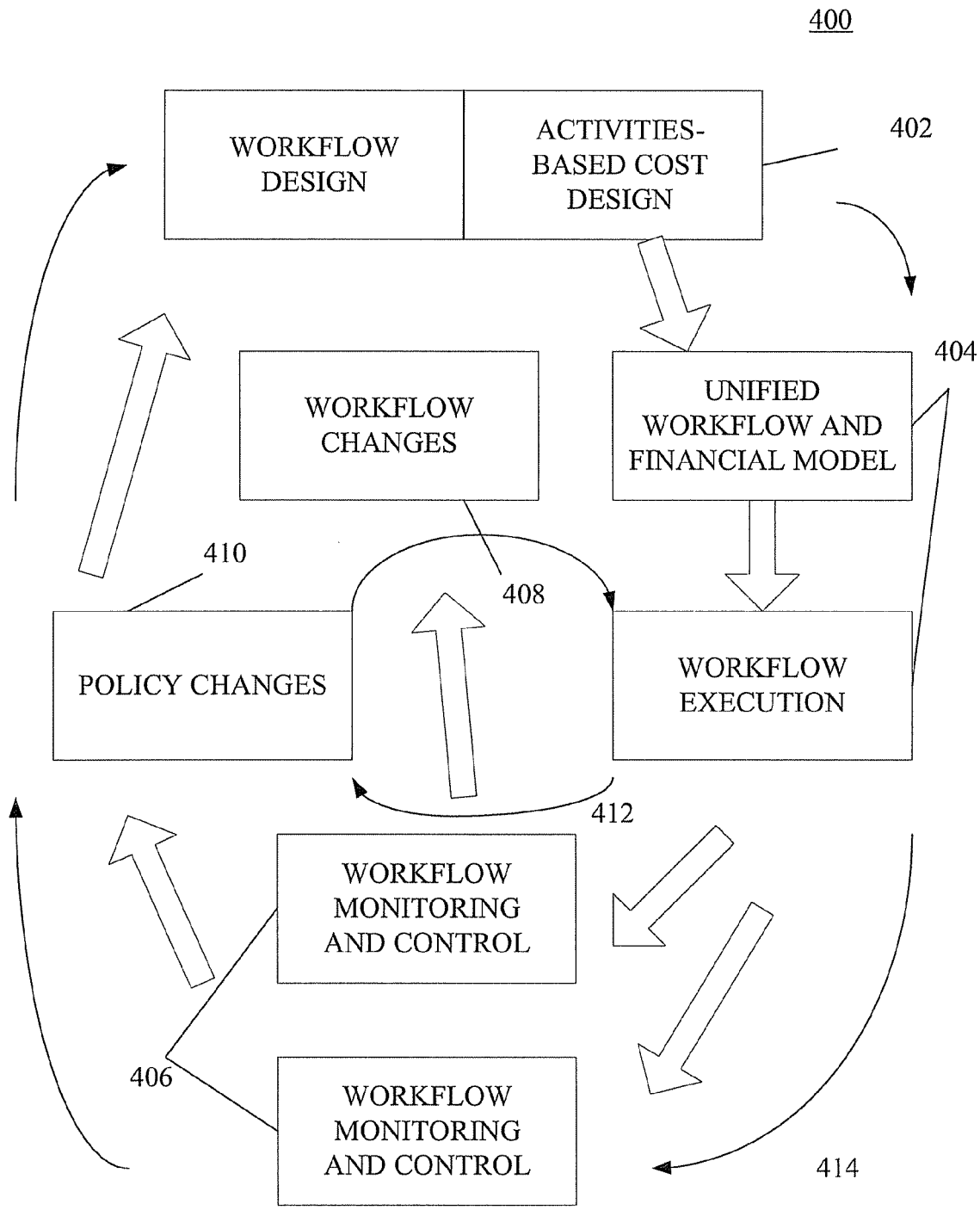
FIG. 4 is a schematic view of an operative application of a system for analyzing a workflow, according to still another embodiment of the invention of the invention

FIG. 4 schematically illustrates an exemplary application of certain aspects of the invention. Initially, at step 402, a workflow is initially designed, and activity-based cost distributions are also designed. According to one embodiment, both are built together in a single tool. Costs can be assigned to work steps based on fixed cost, calculated from data in the workflow, based on durations, and other factors. Costs can also be allocated on the workflow map between steps where real costs are incurred but are not reflected in the workflow. For example, in certain workflows there are storage costs for in-process materials between steps. The storage of such materials is not a work item that is modeled in the workflow, so the workflow is adjusted to model costs outside of the work directly performed. Specifically, a workflow modeling tool that includes cost modeling tools is utilized.

At step 404, the unified workflow model and financial cost model are deployed to a workflow system as a functional application and executed. Each execution accumulates a workflow audit trail, as well as detailed cost information. The information is then fed to two types of monitoring/controlling tasks—workflow and financial—which can be performed by different groups.

Cost data and workflow audit data, at step 406, are used in both the workflow monitoring and controlling applications and also fed to financial monitoring and controlling applications. First, the workflow tools are used to evaluate the performance of the workflow, to determine whether any adjustments are required or if the work is proceeding optimally. Statistics are obtained, such as number of executions, number of times each step is performed, step durations, delays, and so on, as well as summary data gathered in the workflow. These are data items that can be used for decision-making in the workflow.

By providing cost information from the financial model embedded in the workflow, the workflow monitoring and controlling applications can present for analysis not just the number of executions, but also real cost data. This would allow a business process owner, for example, to make evaluations and adjust the workflow based on the real cost of the work. The owner can determine, for example, that a certain step is performed twice as frequently as another, and take action to reduce the number of times the more frequent step is executed. However, based upon cost information, it might be revealed that the cost of the more frequently executed step is only 0.4 times the cost of the second, per execution, and thus the second step actually costs 25% more. According to one aspect of the invention, this and other types of cost data presented in the workflow monitoring tool enhances subsequent analysis, simulation, and optimization of the workflow, making such analysis, simulation, and optimization far more relevant to decision makers.

Additionally, the financial model optionally can include resource behavior that can span multiple processes, such as the ability of the organization to usefully absorb surpluses. The simulation and analysis tools thus are able to provide better information about the possible impact of any proposed change in the workflow. For example, a proposed change to the workflow might reduce the need for a particular resource, but if the surplus resource cannot be utilized, then there is no actual financial benefit to the change. In another example, a proposed change to a workflow might require slightly more of a particular resource. If that resource is at capacity, then the change cannot be implemented, or must be implemented with a higher cost (outsourcing, or the cost of ramping up that resource).

When changes are made to the workflow that rearrange the use of existing resources, the financial model that is connected to the workflow can be automatically adjusted. Automatic adjustment allows the sometimes frequent changes to a workflow in production to continuously reflect current cost data to the monitoring and controlling tools.

At step 406, the cost data generated in the workflow are also provided to financial monitoring tools. These are typically utilized by financial analysts and other decision makers concerned, for example, with the financial implications of decisions pertaining to the workflow and more broadly to the organization carrying out the process. That is, the cost data, like other financial information, can be used to monitor a business or other organization as a whole. A distinct benefit is that current data is obtained and continuously updated cost modeling based on changes to workflow at the business unit or departmental level is provided.

Workflow changes are illustratively made at step 408. At step 410, decisions pertaining to policy changes can be made based on feedback involving the cost distribution. This allows the financial group in the company to monitor the cost outputs of the workflow systems and make global changes to the distribution of costs. Typically, there are a great many different workflows operating in a company, and each one contributes costs and consumes resources. An organization should have a facility for rolling up and distributing down the various costs and resource constraints. From a global financial perspective, a model of costs, activities, and distributions can be built. This global model can be used in the development of the individual workflow/financial models. The output of each workflow is a set of costs that can be rolled up and then compared with the global model. A financial analyst can review the data and make changes to the global financial model. This would then automatically be distributed into each workflow, and so on.

Basically there are two feedback loops that are implemented. The first is the inner loop 412, which is local to each workflow. In this inner loop 412, the workflow runs, and a decision maker periodically monitors the workflow, analyzes results of many executions, perhaps performs certain simulations, and can make small changes to the workflow. This is a fairly rapid loop and many workflows are tweaked frequently in this way. Incorporating cost data is a valuable addition that enhances procedures for optimizing workflow procedures at the individual business process level.

The second feedback loop 414 is larger and covers many workflows and business processes. The second loop 414 starts with a global activity-based cost model, which is used to build the cost data in each of the workflows. As the workflows run, the cost outputs are used as inputs to a global financial monitoring and controlling application. This can be used to refine the global cost model, which in turn produces more refined results in each workflow.

The afore-mentioned policy changes referred to with respect to step 410 can represent any change to the workflow as a result of analysis and optimization. Thus, according to one embodiment, there can be two sources of change. One pertains to the inner loop 412 and stems from individual local analysis, simulation, and/or optimization. The other, pertaining to the outer loop 414, involves predominately financial oversight of the organization or system as a whole. For the outer loop 414, changes can also be made to the distribution of costs.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

I claim:

1. A computer-implemented method, comprising:
measuring cost data generated by repeated execution of a physical process, wherein each activity of the physical process is assigned to a stage in a multi-stage workflow, wherein a financial model associated with the multi-stage workflow contains at least one activity-based cost for performing each activity of the physical process;
estimating, by operation of one or more computer processors, a distribution of costs between at least two of the stages of the multi-stage workflow based on the measured cost data, wherein the distribution of costs assigns a cost value to each activity-based cost in the multi-stage workflow;
determining, based on the distribution of costs, a plurality of simulated distribution of costs and a plurality of simulated total revenues by iteratively varying a value of at least one parameter associated with at least one activity, wherein varying the value of the at least one parameter varies the activity-based cost of the at least one activity; and
upon determining a maximum profit based on the plurality of simulated distribution of costs and the plurality of simulated total revenues, implementing a process change to the multi-stage workflow that alters the physical process based on the value of the at least one parameter that yields the maximum profit.

2. The method of claim 1, further comprising determining, based upon the estimated distribution of costs, whether a cost imbalance is associated with at least one stage of the multi-stage workflow.

3. The method of claim 1, wherein each iteratively varied value generates one simulated distribution of cost and one simulated total revenue.

4. The method of claim 1 further comprising minimizing a total cost of the multi-stage workflow using the estimated distribution of costs and iteratively varying a value of a different parameter to reflect simulated changes in the physical process.

5. The method of claim 1, wherein the at least one parameter comprises at least one among a fixed cost, a variable cost of an activity-associated task, a variable cost based upon time-of-execution of an activity, an opportunity cost of wait time between two consecutive stages of the workflow, a storage cost, utilization cost of a resource used in conjunction with an activity, and an implicit cost of allocated overhead.

6. The method of claim 1, further comprising associating at least one resource constraint with at least one stage of the multi-stage workflow and simulating a change in the physical process by varying the at least one resource constraint and determining for each simulated change in the physical process a corresponding change in the distribution of costs.

7. The method of claim 1, further comprising, allocating non-assignable costs into the multi-stage workflow, wherein the non-assignable costs are incurred by performing the multi-stage workflow and are not generated by performing any respective activity of any stage of the multi-stage workflow, wherein the distribution of costs assigns a cost value to each non-assignable cost in the multi-stage workflow.

8. The method of claim 7, wherein the non-assignable costs are a storage cost incurred between two consecutive stages of the multi-stage workflow.

9. The method of claim 7, wherein the non-assignable costs are based on a wait time between two consecutive stages of the multi-stage workflow.

10. A computer-based system, comprising:
a computer processor; and
a memory containing a program that, when executed on the computer processor, performs an operation comprising:
measuring cost data generated by repeated execution of a physical process, wherein each activity of the physical process is assigned to a stage in a multi-stage workflow, wherein a financial model associated with the multi-stage workflow contains at least one activity-based cost for performing each activity of the physical;
estimating a distribution of costs between at least two of the stages of the multi-stage workflow based on the measured cost data, wherein the distribution of costs assigns a cost value to each activity-based cost costs in the multi-stage workflow;
determining, based on the distribution of costs, a plurality of simulated distribution of costs and a plurality of simulated total revenues by iteratively varying a value of at least one parameter associated with the at least one activity, wherein varying the value of the at least one parameter varies the activity-based cost of at least one activity; and
upon determining a maximum profit based on the plurality of simulated distribution of costs and the plurality of simulated total revenues, implementing a process change to the multi-stage workflow that alters the physical process based on the value of the at least one parameter that yields the maximum profit.

11. The system of claim 10, further comprising determining, based upon the estimated distribution of costs, whether a cost imbalance is associated with at least one stage of the multi-stage workflow.

12. The system of claim 10, wherein each iteratively varied value generates one simulated distribution of cost and one simulated total revenue.

13. The system of claim 10, further comprising estimating a minimum total cost of the multi-stage workflow using the estimated distribution of costs and iteratively varying a value of a different parameter to reflect simulated changes in the physical process.

14. The system of claim 10, further comprising allocating non-assignable costs into the multi-stage workflow, wherein the non-assignable costs are incurred by performing the multi-stage workflow and are not generated by performing any respective activity of any stage of the multi-stage workflow, wherein the distribution of costs assigns a cost value to each non-assignable cost in the multi-stage workflow.

15. A non-transitory computer-readable medium having computer-readable code embedded therein, the computer-readable code comprising:
measuring cost data generated by repeated execution of a physical process, wherein each activity of the physical process is assigned to a stage in a multi-stage workflow, wherein a financial model associated with the multi-stage workflow contains at least one activity-based cost for performing each activity of the physical process
estimating a distribution of costs between at least two of the stages of the multi-stage workflow based on the measured cost data, wherein the distribution of costs assigns a cost value to each activity-based cost in the multi-stage workflow;
determining, based on the distribution of costs, a plurality of simulated distribution of costs and a plurality of simulated total revenues by iteratively varying a value of at least one parameter associated with at least one activity, wherein varying the value of the at least one parameter varies the activity-based cost of the at least one activity
upon determining a maximum profit based on the plurality of simulated distribution of costs and the plurality of simulated total revenues, implementing a process change to the multi-stage workflow that alters the physical process based on the value of the at least one parameter that yields the maximum profit.

16. The non-transitory computer-readable medium of claim 15, wherein the computer-readable code further comprising determining, based upon the estimated distribution of costs, whether a cost imbalance is associated with at least one stage of the multi-stage workflow.

17. The non-transitory computer-readable medium of claim 15, wherein each iterative varied value generates one simulated distribution of cost and one simulated total revenue.

18. The non-transitory computer-readable medium of claim 15, wherein the computer-readable code further comprising computer-readable code for causing the computer to estimate changes in a total cost of the multi-stage workflow using the estimated distribution of costs by iteratively varying the value of a different parameter to reflect simulated changes in the physical process.

19. The non-transitory computer-readable medium of claim 15, wherein the computer-readable code further comprising:
associating at least one resource constraint with at least one stage of the multi-stage workflow; and
simulating a change in the physical process by varying the at least one resource constraint.

20. The non-transitory computer-readable medium of claim 15, wherein the computer-readable code further comprising allocating non-assignable costs into the multi-stage workflow, wherein the non-assignable costs are incurred by performing the multi-stage workflow and are not generated by performing any respective activity of any stage of the multi-stage workflow, wherein the distribution of costs assigns a cost value to each non-assignable cost in the multi-stage workflow.

* * * * *